United States Patent [19]

Fischer et al.

[11] 3,883,509

[45] May 13, 1975

[54] SUBSTITUTED O-[AMINOSULFONYL]-GLYCOLIC AMIDES

[75] Inventors: Adolf Fischer, Mutterstadt; Wolfgang Rohr, Mannheim, both of Germany

[73] Assignee: Badische Anilin- & Soda-Fabrik Aktiengesellschaft, Ludwigshafen, Rhine, Germany

[22] Filed: Apr. 16, 1973

[21] Appl. No.: 351,240

[30] Foreign Application Priority Data

Apr. 22, 1972 Germany............. P 22 19 923.1

[52] U.S. Cl..................... 260/239 B; 71/88; 71/89; 71/91; 71/94; 71/95; 260/239 BA; 260/243 B; 260/247.1 R; 260/247.7 V; 260/268 C; 260/293.85; 260/293.86; 260/326.5 S; 260/326.5 E

[51] Int. Cl.. C07d 41/04; C07d 27/04; C07d 29/34
[58] Field of Search....... 260/239 B, 456 A, 293.85, 260/326.5 S, 239 BA

[56] References Cited
UNITED STATES PATENTS

| | | | |
|---|---|---|---|
| 3,536,721 | 11/1970 | Soong et al. | 260/239 |
| 3,798,254 | 3/1974 | Phillips | 260/293.85 |

*Primary Examiner*—Alton D. Rollins
*Assistant Examiner*—Mark L. Berch
*Attorney, Agent, or Firm*—Johnston, Keil, Thompson & Shurtleff

[57] ABSTRACT

New and valuable substituted O-[aminosulfonyl]-glycolic amides and their use as herbicides.

9 Claims, No Drawings

SUBSTITUTED O-[AMINOSULFONYL]-GLYCOLIC AMIDES

This present invention relates to new and valuable substituted O-[aminosulfonyl]-glycolic amides; their use as herbicides; and herbicides containing these compounds as active ingredients.

It is known to use chloroacetic acid-N-isopropyl anilide as a herbicide. However, its action is only poor.

We have now found that substituted O-[aminosulfonyl]-glycolic amides of the formula

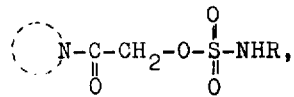

where R denotes hydrogen, alkyl (methyl, ethyl, propyl, isopropyl, n-butyl, isobutyl, sec-butyl, pentyl, hexyl), cycloalkyl (cyclopentyl, cyclohexyl) or haloalkyl ($\alpha$-chloroethyl) and the carbonamide nitrogen is a ring member of an unsubstituted or lower-alkyl-substituted monocyclic or bicyclic cycloalkylimine which may contain further hetero atoms in the ring, have a better herbicidal action.

The following imines may be part of the carbonamide function:

Polymethylenimines:

e.g., tetramethylenimine, pentamethylenimine, 2-methylpentamethylenimine, 3-methylpentamethylenimine, 4-methylpentamethylenimine, 2,4-dimethylpentamethylenimine, 2,5-dimethylpentamethylenimine, 2,6-dimethylpentamethylenimine, 2,4,6-trimethylpentamethylenimine, hexamethylenimine, 2-methylhexamethylenimine, 3-methylhexamethylenimine, 4-methylhexamethylenimine, heptamethylenimine, octamethylenimine, 3-azabicyclo-[3,2,2]-nonane.

Morpholines:

e.g., morpholine, 2-methylmorpholine, 2,5-dimethylmorpholine, 2,6-dimethylmorpholine, thiomorpholine, thiomorpholine-S,S-dioxide.

Piperazine:

e.g., 1-methylpiperazine.

The new compounds may be used as herbicides in amounts of from 0.1 to 10 kg/hectare before sowing, after sowing but preemergence, and after emergence of the crop plants.

They are particularly effective on grasses (Gramineae) and are suitable for use as herbicides in for instance the following crops: Indian corn (*Zea mays*), soybeans [*Glycine max.(hispida)*], cotton (*Gossypium hirsutum*), beet (*Beta vulgaris*), sorghum (*Sorghum bicolor*), rape (*Brassica napus*), peas (*Pisum sativum*), beans (*Phaseolus vulgaris*) and lettuce (*Lactuca sativa*).

The new compounds may be prepared by reacting a substituted glycolic amide with an aminosulfonyl chloride in the presence of an acid acceptor, e.g., triethylamine and pyridine.

EXAMPLE 1

O-[isopropylaminosulfonyl]-glycolic hexamethyleneamide

At 0°C, a solution of 32 parts by weight of isopropylaminosulfonyl chloride in 92 parts by weight of dichloromethane was added to a solution of 23.6 parts by weight of glycolic hexamethyleneamide and 20.2 parts by weight of triethylamine in 660 parts by weight of dichloromethane.

After 2 hours the mixture was washed with dilute hydrochloric acid, then with water, with sodium bicarbonate solution and again with water. The organic phase was dried with magnesium sulfate and concentrated in vacuo. The crude product obtained melts at 75°C to 82°C; the pure compound may be obtained by recrystallization from a mixture of benzene and ligroin and melts at 87° to 88°C.

The compound has the following structural formula:

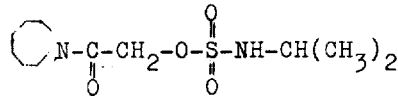

The compounds listed below may be obtained analogously:

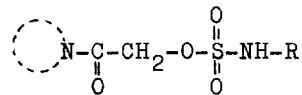

| R | ⟨ ⟩N-H | m.p. (°C) |
|---|---|---|
| H | hexamethylenimine | 105 to 107 |
| CH₃ | " | 107 to 109 |
| C₂H₅ | " | 100 to 101 |
| n-C₃H₇ | " | 59 to 61 |
| n-C₄H₉ | " | 44 to 46 |
| i-C₄H₉ | " | |
| sec-C₄H₉ | " | 48 to 50 |
| C₅H₁₁ | " | |
| C₆H₁₃ | " | |
| cyclopentyl | " | |
| cyclohexyl | hexamethylenimine | |
| 2-chloroethyl | " | |
| H | pentamethylenimine | |
| CH₃ | " | 124 to 126 |
| C₂H₅ | " | 125 to 127 |
| n-C₃H₇ | " | 83 to 85 |
| i-C₃H₇ | " | 98 to 101 |
| n-C₄H₉ | " | |
| i-C₄H₉ | " | |
| sec-C₄H₉ | " | |
| C₅H₁₁ | " | |
| C₆H₁₃ | " | |
| cyclopentyl | " | |
| cyclohexyl | " | |
| 2-chloroethyl | " | |
| H | tetramethylenimine | |
| CH₃ | " | 142 to 144 |
| C₂H₅ | " | 119 to 121 |
| n-C₃H₇ | " | 83 to 84 |
| i-C₃H₇ | " | 100 to 102 |
| n-C₄H₉ | " | 89 to 91 |
| i-C₄H₉ | " | 78 to 79 |
| sec-C₄H₉ | " | 79 to 81 |
| C₅H₁₁ | " | |
| C₆H₁₃ | tetramethylenimine | |
| cyclopentyl | " | |
| cyclohexyl | " | |
| 2-chloroethyl | " | |
| H | 2-methylpentamethylenimine | |
| CH₃ | " | |
| C₂H₅ | " | |
| n-C₃H₇ | " | |
| i-C₃H₇ | " | |
| n-C₄H₉ | " | |
| i-C₄H₉ | " | |
| sec-C₄H₉ | " | |
| C₅H₁₁ | " | |
| C₆H₁₃ | " | |
| cyclopentyl | " | |
| cyclohexyl | " | |
| 2-chloroethyl | " | |
| H | 3-methylpentamethylenimine | |
| CH₃ | " | |

-Continued

| R | Amine | b.p./m.p. (°C) |
|---|---|---|
| C₂H₅ | " | |
| N—C₃H₇ | " | |
| i-C₃H₇ | " | |
| n-C₄H₉ | " | |
| i-C₄H₉ | " | |
| sec-C₄H₉ | " | |
| C₅H₁₁ | " | |
| C₆H₁₃ | 3-methylpentamethylenimine | |
| cyclopentyl | " | |
| cyclohexyl | " | |
| 2-chloroethyl | " | |
| H | 4-methylpentamethylenimine | |
| CH₃ | " | 124 to 126 |
| C₂H₅ | " | |
| n-C₃H₇ | " | |
| i-C₃H₇ | " | 100 to 102 |
| n-C₄H₉ | " | |
| i-C₄H₉ | " | |
| sec-C₄H₉ | " | |
| C₅H₁₁ | " | |
| C₆H₁₃ | " | |
| cyclopentyl | " | |
| cyclohexyl | " | |
| 2-chloroethyl | " | |
| H | 2,6-dimethylpentamethylenimine | |
| CH₃ | " | |
| C₂H₅ | " | |
| n-C₃H₇ | " | |
| i-C₃H₇ | " | |
| n-C₄H₉ | " | |
| i-C₄H₉ | " | |
| sec-C₄H₉ | " | |
| C₅H₁₁ | " | |
| C₆H₁₃ | 2,6-dimethylpentamethylenimine | |
| cyclopentyl | " | |
| cyclohexyl | " | |
| 2-chloroethyl | " | |
| H | 3-azabicyclo-[3,2,2]-nonane | 139 to 141 |
| CH₃ | " | 111 to 113 |
| C₂H₅ | " | 116 to 117 |
| n-C₃H₇ | " | 78 to 80 |
| i-C₃H₇ | " | 105 to 107 |
| n-C₄H₉ | " | 91 to 93 |
| i-C₄H₉ | " | 92 to 94 |
| sec-C₄H₉ | " | 88 to 99 |
| C₅H₁₁ | " | |
| C₆H₁₃ | " | |
| cyclopentyl | " | |
| cyclohexyl | " | |
| 2-chloroethyl | " | |
| H | heptamethylenimine | |
| CH₃ | " | 73 to 75 |
| C₂H₅ | " | |
| n-C₃H₇ | " | |
| i-C₃H₇ | " | 64 to 66 |
| n-C₄H₉ | " | |
| i-C₄H₉ | " | |
| sec-C₄H₉ | " | |
| C₅H₁₁ | heptamethylenimine | |
| C₆H₁₃ | " | |
| cyclopentyl | " | |
| cyclohexyl | " | |
| 2-chloroethyl | " | |
| H | morpholine | |
| CH₃ | " | |
| C₂H₅ | " | |
| n-C₃H₇ | " | |
| i-C₃H₇ | " | 106 to 108 |
| n-C₄H₉ | " | |
| i-C₄H₉ | " | |
| sec-C₄H₉ | " | |
| C₅H₁₁ | " | |
| C₆H₁₃ | " | |
| cyclopentyl | " | |
| cyclohexyl | " | |
| 2-chloroethyl | " | |
| H | 2,6-dimethylmorpholine | |
| CH₃ | " | |
| C₂H₅ | " | |
| n-C₃H₇ | " | |
| i-C₃H₇ | " | |
| n-C₄H₉ | " | |
| i-C₄H₉ | " | |
| sec-C₄H₉ | " | |
| C₅H₁₁ | 2,6-dimethylmorpholine | |
| C₆H₁₃ | " | |
| cyclopentyl | " | |
| cyclohexyl | " | |
| 2-chloroethyl | " | |
| H | thiomorpholine-S,S-dioxide | |
| CH₃ | " | 203 to 206 |
| C₂H₅ | " | |
| n-C₃H₇ | " | |
| i-C₃H₇ | " | 144 to 147 |
| n-C₄H₉ | " | |
| i-C₄H₉ | " | |
| sec-C₄H₉ | " | |
| CH₃ | 3-ethyl-4-methylpentamethyl-enimine | 70 to 71 |
| C₂H₅ | " | 43 to 44 |
| i-C₃H₇ | " | 71 to 72 |

The substituted glycolic amides used as starting materials may be prepared by known methods, e.g., glycolic heptamethyleneamide is obtained by reacting heptamethylenimine with 1,3-dioxolane-2,4-dione (cf. Chem. Soc., 1357, (1951)).

EXAMPLE 2

Glycolic heptamethyleneamide

At 30° to 35°C, a solution of 38 parts by weight of 1,3-dioxolane-2,4-dione in 90 parts by weight of tetrahydrofuran was added, while stirring, to a solution of 41.5 parts by weight of heptamethylenimine in 90 parts by weight of tetrahydrofuran. Upon completion of $CO_2$ evolution the solution was concentrated in vacuo and the oily residue distilled.

Boiling point (0.05 mm Hg): 112° to 114°C; $n_D^{25}$: 1.5022.

The compound has the following structural formula:

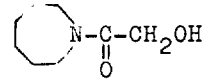

Glycolic amides are also obtained by subjecting the amine glycolates to thermal elimination of water.

EXAMPLE 3

Glycolic hexamethyleneamide

A mixture of 480 parts by weight of hexamethylenimine and 670 parts by weight of 57% aqueous glycolic acid was heated at 195° to 210°C until no more water distilled off.

Subsequently the residue was distilled in vacuo.

Boiling point (0.1 mm Hg): 115° to 125°C; $n_D^{25}$: 1.4990.

The compound has the following structural formula:

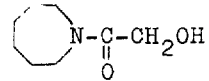

The following glycolic amides may be prepared as in Examples 2 and 3:

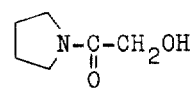

m.p. 42 to 44°C

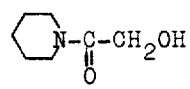

m.p. 39 to 41°C

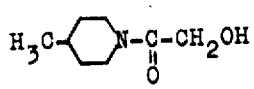
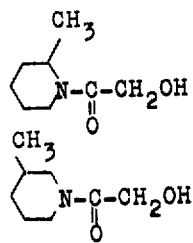
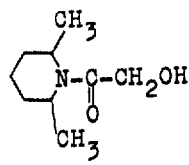
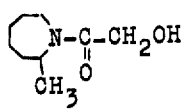
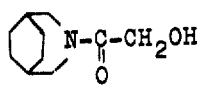  $n_D^{25} = 1.4920$
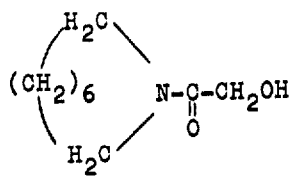  m.p. 54 to 56°C
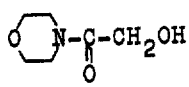
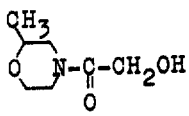  m.p. 70 to 72°C
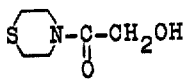
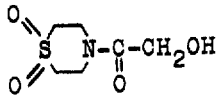
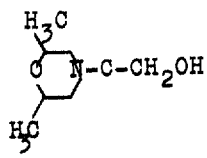  m.p. 164 to 166°C
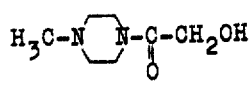
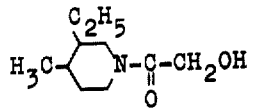  b.p. 108 to 115°C
$n_D^{20} = 1.4881$ The agents according to the invention may be used as solutions, emulsions, suspensions, oil dispersions, granules or dusts. The form of application depends entirely on the purpose for which the agents are being used; in any case it should ensure a fine distribution of the active ingredient.

For the preparation of solutions to be sprayed direct, mineral oil fractions of medium to high boiling point, such as kerosene or diesel oil, further coal-tar oils and oils of vegetable or mineral origin, and cyclic hydrocarbons such as tetrahydronaphthalene and alkylated naphthalenes are suitable.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g., polyethylene oxide adducts. Concentrates which are suitable for dilution with water may be prepared from active ingredient, wetting agent, adherent, emulsifying or dispersing agent and possibly solvent. Oils of various types may be added to ready-to-use spray liquors.

Dusts may be prepared by mixing or grinding the active ingredients with a solid carrier, e.g., clay or fertilizers.

Granules may be prepared by bonding the active ingredients to solid carriers.

Directly sprayable dispersions may also be prepared with oils.

The new compounds may be mixed with fertilizers, insecticides, fungicides and other herbicides.

EXAMPLE 4

In the greenhouse loamy sandy soil was filled into pots and sown with the seeds of cotton (*Gossypium hirsutum*), soybeans (*Soja hispida*), beet (*Beta vulgaris*), slender foxtail (*Alopecurus myosuroides*), wild oats (*Avena fatua*), annual bluegrass (*Poa annua*), goosegrass (*Eleusine indica*), giant foxtail (*Setaria faberii*) and barnyard grass (*Echinochloa crus-galli*). The soil prepared in this manner was then treated with 1.5 kg/hectare of O-[isopropylaminosulfonyl]-glycolic hexamethyleneamide (I) and, for comparison, with 1.5 kg/hectare of chloroacetic N-isopropylanilide (II), each compound being dispersed in 500 liters of water/hectare.

After 4 to 5 weeks it was ascertained that active ingredient I had a better herbicidal action than II, combined with the same good crop plant compatibility.

The results are given below:

|  | Active ingredient | |
|---|---|---|
|  | I | II |
| Crop plants: | | |
| Gossypium hirsutum | 0 | 0 |
| Soja hispida | 0 | 0 |
| Beta vulgaris | 0 | 0 |
| Unwanted plants: | | |
| Alopecurus myosuroides | 100 | 40 |
| Avena fatua | 90 | 30 |
| Poa annua | 100 | 60 |
| Eleusine indica | 100 | 55 |
| Setaria faberii | 100 | 65 |
| Echinochloa crus-galli | 100 | 70 |

0 = no damage
100 = complete destruction

EXAMPLE 5

The plants cotton (*Gossypium hirsutum*), soybeans (*Soja hispida*), rice (*Oryza sativa*), Indian corn (*Zea mays*), beet (*Beta vulgaris*), slender foxtail (*Alopecurus myosuroides*), bluegrass (*Poa trivialis*), wild oats (*Avena fatua*), goosegrass (*Eleusine indica*), yellow nutsedge (*Cyperus esculentus*) and barnyard grass (*Echinochloa crus-galli*) were treated at a growth height of 3 to 17 cm with 1 kg/hectare of O-[isopropylaminosulfonyl]-glycolic hexamethyleneamide (I) and, for comparison, with 1 kg/hectare of chloroacetic N-isopropylanilide (II), each compound being dispersed in 500 liters of water/hectare.

After 3 to 4 weeks it was ascertained that active ingredient I had a better herbicidal action on the unwanted plants than II, combined with superior compatibility with cotton, soybeans and beet.

The results are given below:

|  | Active ingredient | |
|---|---|---|
|  | I | II |
| Crop plants: | | |
| Gossypium hirsutum | 0 | 10 |
| Soja hispida | 5 | 10 |
| Oryza sativa | 10 | 25 |
| Zea mays | 0 | 0 |
| Beta vulgaris | 0 | 5 |
| Unwanted plants: | | |
| Alopecurus myosuroides | 90 | 40 |
| Poa trivialis | 90 | 30 |
| Avena fatua | 75 | 20 |
| Eleusine indica | 95 | 15 |
| Cyperus esculentus | 95 | 45 |
| Echinochloa crus-galli | 100 | 40 |

0 = no damage
100 = complete destruction

EXAMPLE 6

90 parts by weight of compound I is mixed with 10 parts by weight of N-methyl-α-pyrrolidone. A mixture is obtained which is suitable for application in the form of very fine drops.

EXAMPLE 7

20 parts by weight of compound I is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 8

20 parts by weight of compound I is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 9

20 parts by weight of compound I is dissolved in a mixture consisting of 25 parts by weight of cyclohexanol, 65 parts by weight of a mineral oil fraction having a boiling point between 210° and 280°C, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 10

20 parts by weight of compound I is well mixed with 3 parts by weight of the sodium salt of diisobutylnaphthalene-α-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 11

3 parts by weight of compound I is intimately mixed with 97 parts by weight of particulate kaolin. A dust is obtained containing 3% by weight of the active ingredient.

EXAMPLE 12

30 parts by weight of compound I is intimately mixed with a mixture consisting of 92 parts by weight of powdered silica gel and 8 parts by weight of paraffin oil which has been sprayed onto the surface of this silica gel. A formulation of the active ingredient is obtained having good adherence.

EXAMPLE 13

In the greenhouse loamy sandy soil was filled into pots and sown with the seeds of various plants. The soil was then immediately treated with 1.5 kg/hectare of each of the following active ingredients, each being emulsified or dispersed in 500 liters of water/hectare:

I 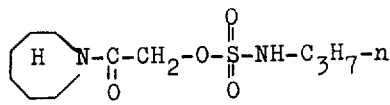

II 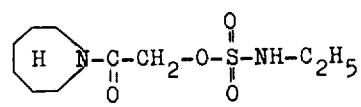

III 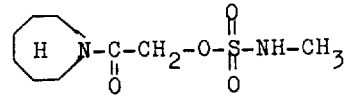

IV 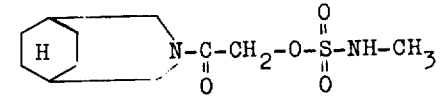

V 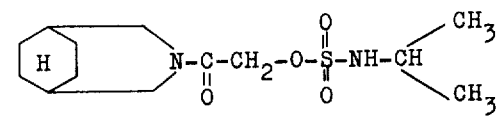

VI 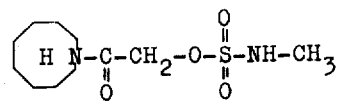

VII 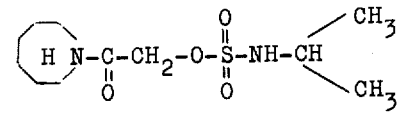

VIII 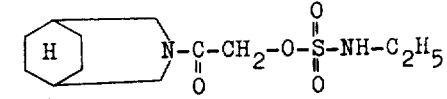

IX 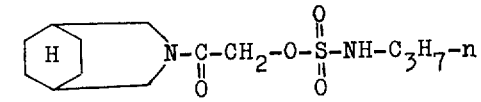

and, for comparison,

X 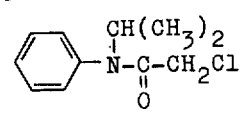

After 4 to 5 weeks it was ascertained that active ingredients I to IX had a better herbicidal action than X, combined with the same good crop plant compatibility.

The results are given below:

EXAMPLE 14

In the greenhouse various plants were treated at a growth height of 3 to 17 cm with 1 kg/hectare of each of the following active ingredients, each compound being emulsified or dispersed in 500 liters of water/hectare:

| Active ingredient kg/ha | I | II | III | IV | V | VI | VII | VIII | IX | X |
|---|---|---|---|---|---|---|---|---|---|---|
| Crop plants: | | | | | | | | | | |
| Gossypium hirsutum | 0 | 0 | 0 | 0 | 0 | 0 | 0 | 0 | 0 | 0 |
| Soja hispida | 0 | 0 | 0 | 0 | 0 | 0 | 0 | 0 | 0 | 0 |
| Buta vulgaris | 0 | 0 | 0 | 0 | 0 | 0 | 0 | 0 | 0 | 0 |
| Unwanted plants: | | | | | | | | | | |
| Alopecurus myosuroides | 100 | 100 | 100 | 100 | 100 | 100 | 100 | 80 | 85 | 40 |
| Avena fatua | 95 | 90 | 90 | 75 | 75 | 50 | 50 | 85 | 95 | 30 |
| Poa annua | 100 | 100 | 100 | 100 | 100 | 100 | 95 | 90 | 80 | 60 |
| Eleusine indica | 100 | 100 | 100 | 90 | 90 | 90 | 95 | 80 | 80 | 55 |
| Setaria faberii | 100 | 100 | 100 | 100 | 100 | 95 | 70 | 75 | 70 | 65 |
| Echinochloa crusgalli | 100 | 100 | 100 | 100 | 100 | 100 | 75 | 95 | 75 | 70 |

0 = no damage
100 = complete destruction

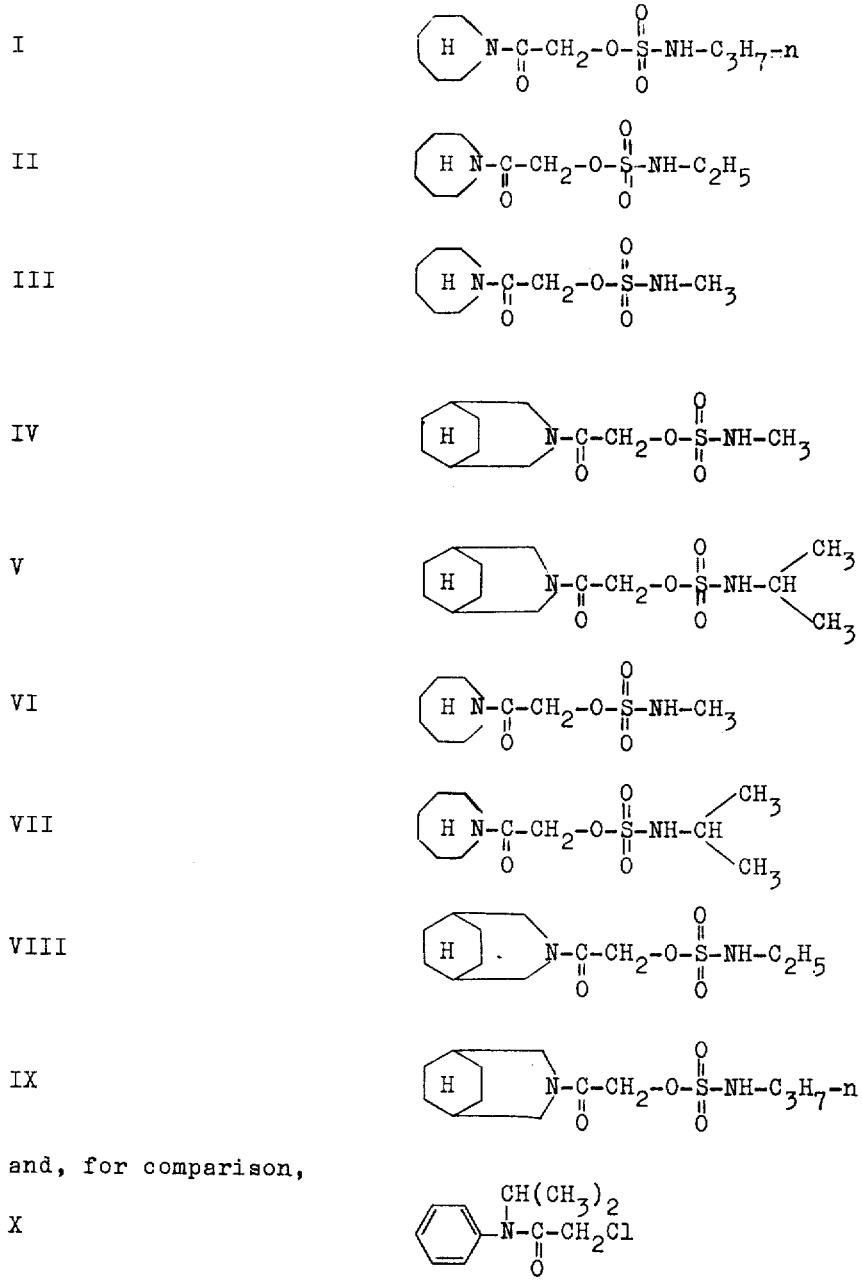

and, for comparison, X

After 3 to 4 days it was ascertained that active ingredients I to IX had a crop plant compatibility superior to that of X.

The results are given below:

| Active ingredient kg/ha | I | II | III | IV | V | VI | VII | VIII | IX | X |
|---|---|---|---|---|---|---|---|---|---|---|
| Crop plants: | | | | | | | | | | |
| Gossypium hirsutum | 0 | 0 | 0 | 0 | 0 | 0 | 0 | 0 | 0 | 10 |
| Soja hispida | 5 | 0 | 0 | 5 | 5 | 10 | 0 | 0 | 0 | 10 |
| Oryza sativa | 15 | 10 | 15 | 15 | 15 | 0 | 0 | 0 | 0 | 25 |
| Zea mays | 0 | 0 | 0 | 0 | 0 | 0 | 0 | 0 | 0 | 0 |
| Beta vulgaris | 0 | 0 | 0 | 0 | 0 | 0 | 0 | 0 | 0 | 5 |
| Unwanted plants: | | | | | | | | | | |
| Alopecurus myosuroides | 100 | 90 | 80 | 100 | 100 | 50 | 50 | 100 | 75 | 40 |
| Poa trivialis | 95 | 90 | 80 | 95 | 95 | 50 | 50 | 100 | 80 | 30 |
| Avena fatua | 80 | 60 | 65 | 70 | 70 | 30 | 40 | 80 | 70 | 20 |
| Eleusine indica | 95 | 90 | 90 | 95 | 95 | 30 | 30 | 70 | 60 | 15 |
| Cyperus esculentus | 75 | 75 | 70 | 70 | 70 | 50 | 50 | 60 | 50 | 45 |
| Echinochloa crusgalli | 100 | 100 | 95 | 95 | 95 | 50 | 45 | 95 | 60 | 40 |

0 = no damage
100 = complete 0

We claim:

1. A substituted O-[aminosulfonyl]-glycolic amide of the formula

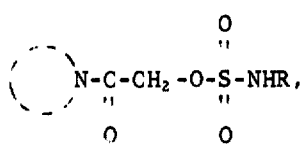

where R denotes hydrogen, alkyl of one to six carbon atoms, cyclopentyl, cyclohexyl or haloalkyl of one to six carbon atoms and the carbonamide nitrogen is a member of an unsubstituted or lower-alkyl-substituted tetramethylenimine, pentamethylenimine, hexamethylenimine, heptamethylenimine, octamethylenimine, or 3-azabicyclo-[3,2,2]-nonane ring.

2. O-[aminosulfonyl]-glycolic hexamethyleneamide.
3. O-[methylaminosulfonyl]-glycolic hexamethyleneamide.
4. O-[ethylaminosulfonyl]-glycolic hexamethyleneamide.
5. O-[propylaminosulfonyl]-glycolic hexamethyleneamide.
6. O-[isopropylaminosulfonyl]-glycolic hexamethyleneamide.
7. O-[n-butylaminosulfonyl]-glycolic hexamethyleneamide.
8. O-[isobutylaminosulfonyl]-glycolic hexamethyleneamide.
9. O-[sec-butylaminosulfonyl]-glycolic hexamethyleneamide.

* * * * *